US008666869B2

(12) United States Patent
Marigliano (10) Patent No.: US 8,666,869 B2
(45) Date of Patent: Mar. 4, 2014

(54) SYSTEMS FOR ELECTRONIC TRADING

(75) Inventor: Donald E. Marigliano, Rockville Centre, NY (US)

(73) Assignee: Redi Tech, LLC, Jersey City, NJ (US)

( * ) Notice: Subject to any disclaimer, the term of this patent is extended or adjusted under 35 U.S.C. 154(b) by 2476 days.

(21) Appl. No.: 10/634,698

(22) Filed: Aug. 5, 2003

(65) Prior Publication Data

US 2004/0030635 A1 Feb. 12, 2004

Related U.S. Application Data

(60) Provisional application No. 60/401,265, filed on Aug. 6, 2002.

(51) Int. Cl.
*G06Q 40/00* (2012.01)

(52) U.S. Cl.
USPC .......................................................... 705/37

(58) Field of Classification Search
USPC .......................................................... 705/37
See application file for complete search history.

(56) References Cited

U.S. PATENT DOCUMENTS

| | | | |
|---|---|---|---|
| 6,876,981 B1 * | 4/2005 | Berckmans ...................... | 705/35 |
| 7,529,701 B2 * | 5/2009 | Shields et al. .................. | 705/35 |
| 2002/0152153 A1 * | 10/2002 | Nakagawa ...................... | 705/37 |
| 2002/0194110 A1 * | 12/2002 | Young .............................. | 705/37 |
| 2003/0004853 A1 * | 1/2003 | Ram et al. ....................... | 705/37 |

OTHER PUBLICATIONS

"eTelemet Features—Opinitons Montage", download from http://www.etelemet.com/features/options.htm on Apr. 4, 2002. 4pgs.
"Level II Tab", download from http://channel.bridge.com/bc/webhelp/Level_II_Tab.htm on Apr. 4, 2002. 3pgs.
"Hyperfeed", download from http://www.hyperfeed.com/a_options.html on Apr. 4, 2002. 3pgs.
"Auditrade.com Brokerage System", download from http://www2.sungardfutures.com/kcbtprogam/spread_ticket.html on Apr. 3, 2002. 2pgs.
"CME.Auditrade.com Demo4", download from http://cme.usvirtual.net/demo4.html on Apr. 3, 2002. 3pgs.
"Xpresstrade—Demonstration Pages", download from http://www.xpresstrade.com/freedemo/tradcen/futuresprds/futuresprds_2.html on Apr. 3, 2002. 1pg.
Bach, A. Francis "The Use of IP Multicasting to Disseminate Market Data Information", Sep./Oct. 1997, download from http://www.siac.com/in_the_news/wsta_ip.html on Apr. 10, 2007. 5 pgs.
"My eSignal" download from http://www.esignal.com/myesignal/features.asp on Apr. 4, 2002. 3pgs.

* cited by examiner

*Primary Examiner* — Jessica Lemieux
(74) *Attorney, Agent, or Firm* — Perkins Coie LLP (57) ABSTRACT

Systems are provided to manage option information. According to some embodiments, a user interface is provided including at least one option quote area presenting a plurality of option quotes, and an order entry area comprising input areas for inputting two or more option orders. A selection of one of the presented plurality of option quotes may be received and details of an option order corresponding to the selected option quote may be presented in appropriate input areas of the order entry area. In some aspects, a number of option quotes to present in at least one of the at least one option quote area is received, and the number of option quotes is presented in the at least one of the at least one option quote area.

18 Claims, 10 Drawing Sheets

| AOO | ⇧ | Bid 45.09 | Ask 45.14 | Change .30 | Close 45.79 | High 46.46 |
|---|---|---|---|---|---|---|
| Misc | | | | | | |
| Low 44.29 | | Last 45.10 | Open 44.59 | % .59% | Size 10x10 | Volume 47896 |

| 1Jul ▼ | | | At the Money ▼ | | Four ▼ | | Composite ▼ | | | | |
|---|---|---|---|---|---|---|---|---|---|---|---|
| Last | Chg | Bid | Ask | Size | Vol | YM | Strike | Root | Last | Chg | Bid | Ask | Size | Vol |
| 11.00 | 0.00 | 11.20 | 11.60 | 575x10 | 24 | 1JUL | 35.00 | AOO | 0.30 | 0.00 | 0.15 | 0.25 | 1090X20 | 1629 |
| 8.40 | 0.00 | 8.60 | 9.00 | 0x298 | 8 | 1JUL | 37.50 | AOO | 0.40 | 0.05 | 0.30 | 0.40 | 100X100 | 1193 |
| 6.40 | -0.05 | 6.50 | 6.80 | 0x42 | 10 | 1JUL | 40.00 | AOO | 0.50 | -0.15 | 0.50 | 0.60 | 100X100 | 1237 |
| 4.30 | 0.30 | 4.30 | 4.60 | 0x100 | 1 | 1JUL | 42.50 | AOO | 0.95 | -0.20 | 1.00 | 1.05 | 100X100 | 228 |
| 1.30 | 0.40 | 1.25 | 1.05 | 0x1 | 686 | 1JUL | 45.00 | AOO | 2.90 | -0.20 | 3.00 | 3.10 | 100X20 | 64 |
| .25 | 0.10 | 0.55 | 0.65 | 0x1 | 2331 | 1JUL | 47.50 | AOO | 6.80 | -0.60 | 6.90 | 7.10 | 100X20 | |
| .10 | 0.05 | — | 0.10 | 0x1 | 755 | 1JUL | 50.00 | AOO | 12.30 | 0.00 | 11.70 | 12.10 | 675X20 | |
| .15 | 0.10 | — | 0.05 | 10x1 | 42 | 1JUL | 55.00 | AOO | 17.20 | 0.00 | 16.70 | 17.10 | 20X100 | |
| .15 | 0.10 | — | 0.05 | 100x100 | | 1JUL | 60.00 | AOO | 22.20 | 0.00 | 21.70 | 22.10 | 425X20 | |

| AOO ▼ | Account No. ▼ | Firm | Limit ▼ | Default ▼ | Day ▼ |
|---|---|---|---|---|---|
| Buy/Sell | Quantity | Type | Month | Strike | Position | Price |
| ▶ | | ▶ | ▶ | ▶ | ▶ | |
| ▶ | | ▶ | ▶ | ▶ | ▶ | |
| ▶ | | ▶ | ▶ | ▶ | ▶ | |
| ▶ | | ▶ | ▶ | ▶ | ▶ | |

Submit

EQUITY: AOO  TYPE: CALLS  500 ← 293

| EXCHANGE 501 | STRIKE PRICE 502 | DATE 503 | LAST 504 | CHG 505 | BID 506 | ASK 507 | VOL 508 | SIZE 509 |
|---|---|---|---|---|---|---|---|---|
| AMEX | 35.00 | 1JUL | 11.00 | 0.00 | 11.20 | 11.60 | 24 | 575x10 |
| AMEX | 37.50 | 1JUL | 8.40 | 0.00 | 8.60 | 9.00 | 8 | 0x298 |
| PSX | 40.00 | 1JUL | 6.40 | -0.05 | 6.50 | 6.80 | 10 | 0x42 |
| ISE | 42.50 | 1JUL | 4.30 | 0.30 | 4.30 | 4.60 | 1 | 0x100 |
| PSX | 45.00 | 1JUL | 1.30 | 0.40 | 1.25 | 1.05 | 686 | 0x100 |
| PSX | 47.50 | 1JUL | 0.25 | 0.10 | 0.55 | 0.65 | 2331 | 0x1 |
| AMEX | 50.00 | 1JUL | 0.10 | 0.05 | -- | 0.10 | 755 | 0x1 |
| ISE | 55.00 | 1JUL | 0.15 | 0.10 | -- | 0.05 | 42 | 10x10 |
| ISE | 60.00 | 1JUL | 0.15 | 0.10 | -- | 0.05 | NONE | 100x100 |

FIG. 5

| EQUITY 601 | LOW 602 | BID 603 | LAST 604 | ASK 605 | OPEN 606 | CHANGE 607 | % 608 | CLOSE 609 | SIZE 610 | HIGH 611 | VOL 612 |
|---|---|---|---|---|---|---|---|---|---|---|---|
| AOO | 44.29 | 45.09 | 45.10 | 45.14 | 44.59 | .30 | .59 | 45.79 | 10X10 | 46.46 | 47869 |
| XGH | 23.35 | 24.22 | 24.30 | 24.45 | 23.88 | .35 | 1.3 | 24.93 | 10X10 | 25.60 | 15890 |
| QWE | 67.00 | 68.85 | 69.60 | 69.96 | 68.77 | .25 | .18 | 71.05 | 5X20 | 72.55 | 100345 |

| NAME 701 | ACCOUNT NO. 702 | AUTHORIZATION INFORMATION 703 | PREFERENCES 704 |
|---|---|---|---|
| DONALD MARIGLIANO | 01-3458695 | USER | COLOR CODING; CONTEXT-BASED FIELDS |
| DANIEL OPPERMAN | A23409U48 | ADMINISTRATOR | FIRM = SLK; REFRESH = 10 SEC. |

| AOO | | | | | | | | | | | | |
|---|---|---|---|---|---|---|---|---|---|---|---|---|
| Misc | ⇧ | Bid 45.09 | | Ask 45.14 | | Change .30 | | Close 45.79 | | High 46.46 | | |
| Low 44.29 | | Last 45.10 | | Open 44.59 | | % .59% | | Size 10x10 | | Volume 47896 | | |
| 1Jul ▼ | | At the Money ▼ | | Four ▼ Composite ▼ | | | | | | | | |
| Last | Chg | Bid | Ask | Size | | Strike | Root | Last | Chg | Bid | Ask | Vol |
| | | | | | Show all | | | | | | | Size |
| 11.00 | 0.00 | 11.20 | 11.60 | 575x10 | One | 35.00 | AOO | 0.30 | 0.00 | 0.15 | 0.25 | 1090X20 |
| 8.40 | 0.00 | 8.60 | 9.00 | 0x298 | Two | 37.50 | AOO | 0.40 | 0.05 | 0.30 | 0.40 | 100X100 1629 |
| 6.40 | -0.05 | 6.50 | 6.80 | 0x42 | Three | 40.00 | AOO | 0.50 | -0.15 | 0.50 | 0.60 | 100X100 1193 |
| 4.30 | 0.30 | 4.30 | 4.60 | 0x100 | Four | 42.50 | AOO | 0.95 | -0.20 | 1.00 | 1.05 | 100X100 1237 |
| 1.30 | 0.40 | 1.25 | 1.05 | 0x1 | Five | 45.00 | AOO | 2.90 | -0.20 | 3.00 | 3.10 | 100X20 228 |
| .25 | 0.10 | 0.55 | 0.65 | 0x1 | Six | 47.50 | AOO | 6.80 | -0.60 | 6.90 | 7.10 | 100X20 64 |
| .10 | 0.05 | — | 0.10 | 0x1 | 1JUL | 50.00 | AOO | 12.30 | 0.00 | 11.70 | 12.10 | 675X20 |
| .15 | 0.10 | — | 0.05 | 10x10 | 1JUL | 55.00 | AOO | 17.20 | 0.00 | 16.70 | 17.10 | 20X100 |
| .15 | 0.10 | — | 0.05 | 100x100 | 1JUL | 60.00 | AOO | 22.20 | 0.00 | 21.70 | 22.10 | 425X20 |

| AOO ▼ | Account No. ▼ | Firm ▼ | Limit ▼ | Default ▼ | Day ▼ | |
|---|---|---|---|---|---|---|
| Buy/Sell | Quantity | Type | Month | Strike | Position | Price |
| ▶ | | ▶ | ▶ | ▶ | ▶ | |
| ▶ | | ▶ | ▶ | ▶ | ▶ | |
| ▶ | | ▶ | ▶ | ▶ | ▶ | |
| ▶ | | ▶ | ▶ | ▶ | ▶ | Submit |

| AOO | | | | Bid 45.09 | | Ask 45.14 | | Close 45.79 | | High 46.46 |
|---|---|---|---|---|---|---|---|---|---|---|
| Misc | ⇧ | | | Last 45.10 | | Open 44.59 | | | | |
| Low 44.29 | | | | | | | | | | |
| | | | | At the Money ▶ | | Three ▶ | | 10x10 | | Volume 47896 |
| 1Jul ▶ | | | | | | | | | | |
| | | | | | | | Change .30 | | | |
| | | | | | | | % .59% | | | |
| | | | | | | | Composite ▶ | | | |

| Last | Chg | Bid | Ask | Size | Vol | YM | Strike | Root | Last | Chg | Bid | Ask | Size | Vol |
|---|---|---|---|---|---|---|---|---|---|---|---|---|---|---|
| 8.40 | 0.00 | 8.60 | 9.00 | 0x298 | 8 | 1JUL | 37.50 | AOO | 0.40 | 0.05 | 0.30 | 0.40 | 100X100 | 1629 |
| 6.40 | -0.05 | 6.50 | 6.80 | 0x42 | 10 | 1JUL | 40.00 | AOO | 0.50 | -0.15 | 0.50 | 0.60 | 100X100 | 1193 |
| 4.30 | 0.30 | 4.30 | 4.60 | 0x100 | 1 | 1JUL | 42.50 | AOO | 0.95 | -0.20 | 1.00 | 1.05 | 100X100 | 1237 |
| 1.30 | 0.40 | 1.25 | 1.05 | 0x1 | 686 | 1JUL | 45.00 | AOO | 2.90 | -0.20 | 3.00 | 3.10 | 100X20 | 228 |
| .25 | 0.10 | 0.55 | 0.65 | 0x1 | 2331 | 1JUL | 47.50 | AOO | 6.80 | -0.60 | 6.90 | 7.10 | 100X20 | 64 |
| .10 | 0.05 | --- | 0.10 | 0x1 | 755 | 1JUL | 50.00 | AOO | 12.30 | 0.00 | 11.70 | 12.10 | 675X20 | |
| .15 | 0.10 | --- | 0.05 | 10x10 | 42 | 1JUL | 55.00 | AOO | 17.20 | 0.00 | 16.70 | 17.10 | 20X100 | |

| AOO ▶ | 01-3458695 ▶ | Firm ▶ | Limit ▶ | Default ▶ | Day ▶ | | |
|---|---|---|---|---|---|---|---|
| Buy/Sell | Quantity | Type | Month | Strike | Position | Price | |
| Buy ▶ | 25 | Call ▶ | 1JUL ▶ | 40.00 | Open ▶ | 6.50 | Submit |
| Sell ▶ | 10 | Call ▶ | 1JUL ▶ | 42.50 | Open ▶ | 4.30 | |
| Buy ▶ | 10 | Put ▶ | 1JUL ▶ | 42.50 | Open ▶ | 1.00 | |
| Sell ▶ | 10 | Put ▶ | 1JUL ▶ | 45.00 | Open ▶ | 3.00 | |

SYSTEMS FOR ELECTRONIC TRADING

CROSS REFERENCE TO RELATED APPLICATIONS

This application claims priority to Provisional Application Ser. No. 60/401,265, filed Aug. 6, 2002 and entitled "Systems for Electronic Trading".

FIELD

The present invention relates to electronic trading platforms. In some embodiments, the present invention relates to an electronic trading platform that provides for efficient presentation of option quote information and for efficient placement of option orders based thereon.

BACKGROUND

Electronic trading is ubiquitous in today's financial community. Generally, electronic trading allows traders to place orders through a user device such as a desktop computer.

Architectures of electronic trading systems vary widely. In some systems, a trader interacts with an electronic trading platform presented by the user device. The electronic trading platform may be an internally-developed system or an off-the-shelf system, such as the REDIPlus™ system. The electronic trading platform may communicate with pools of liquidity directly or through a routing and order management network, such as REDINet™. Such pools of liquidity include listed exchanges, ECNs (Electronic Communications Networks), market makers, options exchanges, futures exchanges, and the like. An electronic trading platform and/or management network may also communicate with in-house back-end systems to provide trade reporting and tracking functions to the trader.

Many electronic trading platforms and management networks are currently available, each providing specific features. Many of these features are intended to clearly present market information to a trader, and others are intended to facilitate trading functions. In this regard, some of these features allow a trader to customize the presentation to his liking, while others allow automated order placement.

Despite the foregoing, what is needed are improved electronic trading platforms that offer efficient interface customization and order placement.

SUMMARY

To address the foregoing, embodiments of the present invention concern a system, a method, an apparatus, a medium storing processor-executable process steps, and means to present at least one option quote area presenting a plurality of option quotes, and to present an order entry area comprising input areas for inputting two or more option orders. According to some aspects, presentation of the at least one option quote area may include reception of a number of strike prices above and/or below a particular option strike price for which associated option quotes should be presented in at least one of the at least one option quote area, and presentation of option quotes associated with the number of strike prices above and/or below the particular option strike price in the at least one of the at least one option quote area. In some aspects, the present invention also or alternatively provides reception of a selection of one of the presented plurality of option quotes, and presentation of details of an option order corresponding to the selected option quote in appropriate input areas of the order entry area.

Embodiments of the present invention may provide a user interface that includes at least one option quote area presenting a plurality of option quotes, and an order entry area comprising input areas for inputting two or more option orders. The interface may also include a control usable to specify a number of strike prices above and/or below a particular option strike price for which associated option quotes should be presented in at least one of the at least one option quote area.

With these and other advantages and features of the invention that will become hereinafter apparent, the invention may be more clearly understood by reference to the following detailed description of the invention, the appended claims, and the drawings attached hereto.

DETAILED DESCRIPTION

User Interface

Figure 1:
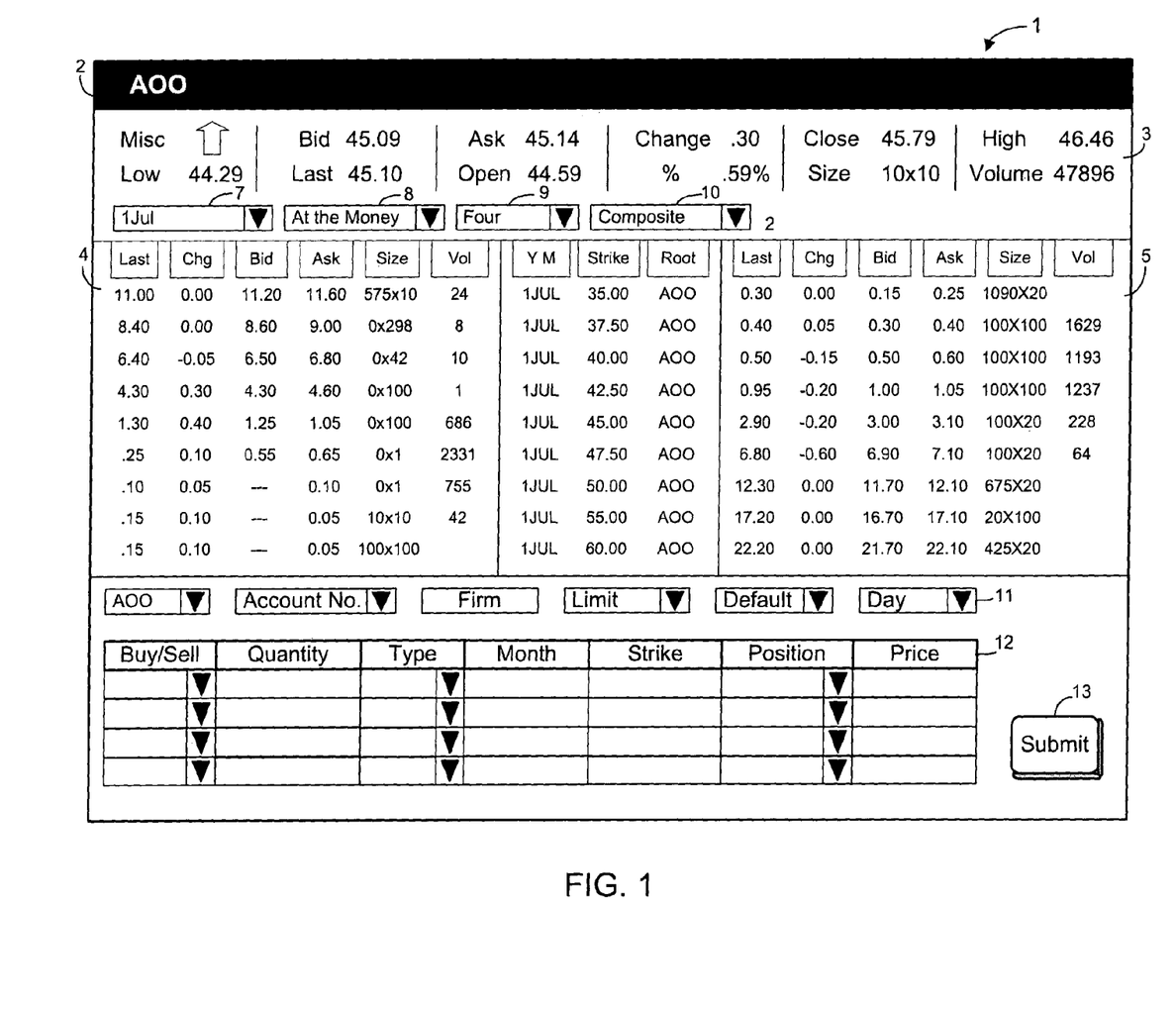
FIG. 1 is an outward view of a user interface according to some embodiments of the present invention.

FIG. 1 is an outward view of a user interface according to some embodiments of the present invention. User interface 1 includes several areas, each presenting information related to options. Title bar 2 specifies a particular security that underlies the options for which information is presented in interface 1. The underlying security may be any of a number of commonly-traded securities, such as, for example: a commodity, currency, equity, index, futures contract or the like. For the purposes of illustrating features of embodiments of the present invention, throughout the remainder of this specification, the underlying securities described will be equity securities. For example, as depicted in FIG. 1, an information area 3 is provided—in the illustrative embodiment depicted, information area 3 is an equity information area 3. In this regard, equity information area 3 presents Level I information associated with the particular equity.

Option quote area 4 presents a plurality of option quotes associated with options for which the underlying equity is the particular equity specified in title bar 2. Each option quote specifies Level II data of an associated option, including "Last", "Chg", "Bid", "Ask", "Size" and "Vol.". Other data may also or alternatively be specified by each option quote of option quote area 4. In the FIG. 1 embodiment, option quote area 4 presents quotes associated with Call options. Similarly, option quote area 5 presents a plurality of option quotes associated with Put options for which the underlying equity is the particular equity specified in title bar 2.

Each option quote presented in option quote area 4 and option quote area 5 is associated with a color that is determined based on a difference between a strike price of the option quote and a current price of the equity underlying the option quote. For example, an option quote having a strike price equal to the current price of the underlying equity (thereby reflecting an "at the money" option) may be presented with a bright blue background color. Moreover, an option quote having a strike price $5 from the current price of the equity may be presented with a less-bright blue background, while an option quote having a strike price $15 from the current price of the equity may be presented with an even less-bright blue background. Of course, embodiments of the invention may utilize other conventions to associate an option quote with a color that is determined based on a difference between a strike price of the option quote and a current price of the equity underlying the option quote. These conventions include presenting text of one or more data fields associated with an option quote in the determined color. The color may also be determined based on whether and/or how far an option quote is "in the money" or "out of the money". Due to limitations in the reproduction of patent documents, the accompanying figures are unable to present examples of the uses of color described herein.

In some embodiments, a user may select a presented option quote by "double-clicking" on the quote. In response, a second interface including further details associated with the option quote is presented to the user. The details may include option quotes from each available exchange. These latter option quotes may correspond to the same option to which the selected option quote corresponds.

In the illustrated embodiment, each options exchange is associated with a unique color. Accordingly, all presented options quotes that are associated with a particular exchange are presented in association with the unique color associated with the particular exchange. The unique color may be used as a background color and/or a text color of the option quote.

Each row of option identification area 6 identifies an option for which option quote information is presented in an identical row of option quote areas 4 and 5. The option is identified by its associated month and year, strike price, and the symbol of its underlying equity.

Fields 7 through 10 allow a user to customize the information presented in areas 4 through 6. Fields 7 through 10, as well as several other input fields of the FIG. 1 embodiment, comprise pull-down menus. However, it should be noted that other data entry methods may be used in conjunction with one or more of the input fields.

Date field 7 allows a user to specify a month and year of an option of interest, while strike price field 8 allows a user to specify a price of an option of interest. The price may be specified relative to a price of the underlying equity, for example by specifying "at the money" or another relative term. An option identified by the data entered in fields 7 and 8 is represented in the middle row of option identification area 6. Accordingly, option quotes associated with the identified option are presented in the middle row of areas 4 and 5.

In the embodiment shown in FIG. 1, an option having a date and strike price specified in fields 7 and 8 is described in a center row of option identification area 6. In this regard, the designation "at the money" in field 8 specifies a strike price roughly equal to the last equity price shown in equity information area 3. Option quote information associated with the described option is presented in the center row of areas 4 and 5. Accordingly, in a case that the last equity price changes, the option quote information presented in the middle row of areas 4 and 5 may change in order to describe an option having a new strike price that is described in the center row of option identification area 6.

Show field 9 allows a user to specify a number of strike prices above and below the strike price specified in field 8 for which associated option quotes should be presented in option quote areas 4 and 5. According to the present example, option quote information corresponding to four options that are associated with strike prices above the price specified in field 8 and four options that are associated with strike prices below the specified price are presented in each of areas 4 and 5. In some embodiments, interface 1 includes one or more fields for specifying a number of strike prices above and/or below the specified strike price for which associated option quotes should be presented in areas 4 and/or 5. Also in some embodiments, a field is provided for specifying an interval between strike prices of adjacent options in option identification area 6. In the example of FIG. 1, this interval is $2.50.

Exchange field 10 allows a user to specify one or more exchanges from which option quotes should be presented in areas 4 and 5. In operation, Call option quotes for a particular option are received from each exchange listed in field 10, wherein the designation "composite" identifies all available exchanges. Of the received option quotes, the quote having the lowest "Last" price is presented in association with the option in option quote area 4. According to some embodiments, each option exchange is associated with a particular color, and a quote received from a particular exchange is presented in association with the particular color associated with the particular exchange. The color may be associated with the presented quote by virtue of the quote's text color, background color, or the like.

Order bar 11 provides some details of an option order to be placed using interface 1. From left to right, the fields of order bar 11 are populated by the symbol of the underlying equity, an account under which the order is to be placed, an identity of a broker/dealer representing the order on the trading floor (also known as a firm giveup), an order type such as Limit, Market and Market Close, an exchange in which the order is to be placed, and a period of time during which the order will be in force.

Order entry area 12 provides fields in which a user may input information associated with up to four option orders. The information includes an indication of whether the order is an order to buy or to sell an option, a desired number of contracts, whether the option is a Call or a Put option, a month and year of the option, an option strike price, an option position such as "open" or "close", and a price of the option. Of course, an option order entry area according to embodiments of the present invention may include fields other than those shown in FIG. 1, including one or more of the fields of order bar 11. It should also be noted that some embodiments of the invention allow users to input details of only a particular number of option orders into order entry area 12, while other embodiments allow users to input details of up to a number of option orders for which fields are provided in order entry area 12.

Fields of order entry area 12 may be populated by selection of an option quote that is presented in option quote areas 4 and/or 5. This feature will be described in more detail below with respect to FIGS. 9 and 10. Once one or more orders are input into order entry 12, a user may select Submit button 13 to simultaneously place the one or more orders. Order entry area 12 of the FIG. 1 embodiment thereby provides for efficient placement of multiple option orders, including spread orders such as butterfly, bull and bear spreads using Calls or Puts.

The foregoing description is intended to familiarize the reader with features of interfaces according to some embodiments of the present invention. Further details regarding the generation and operation of such interfaces are provided below.

System Architecture

Figure 2:
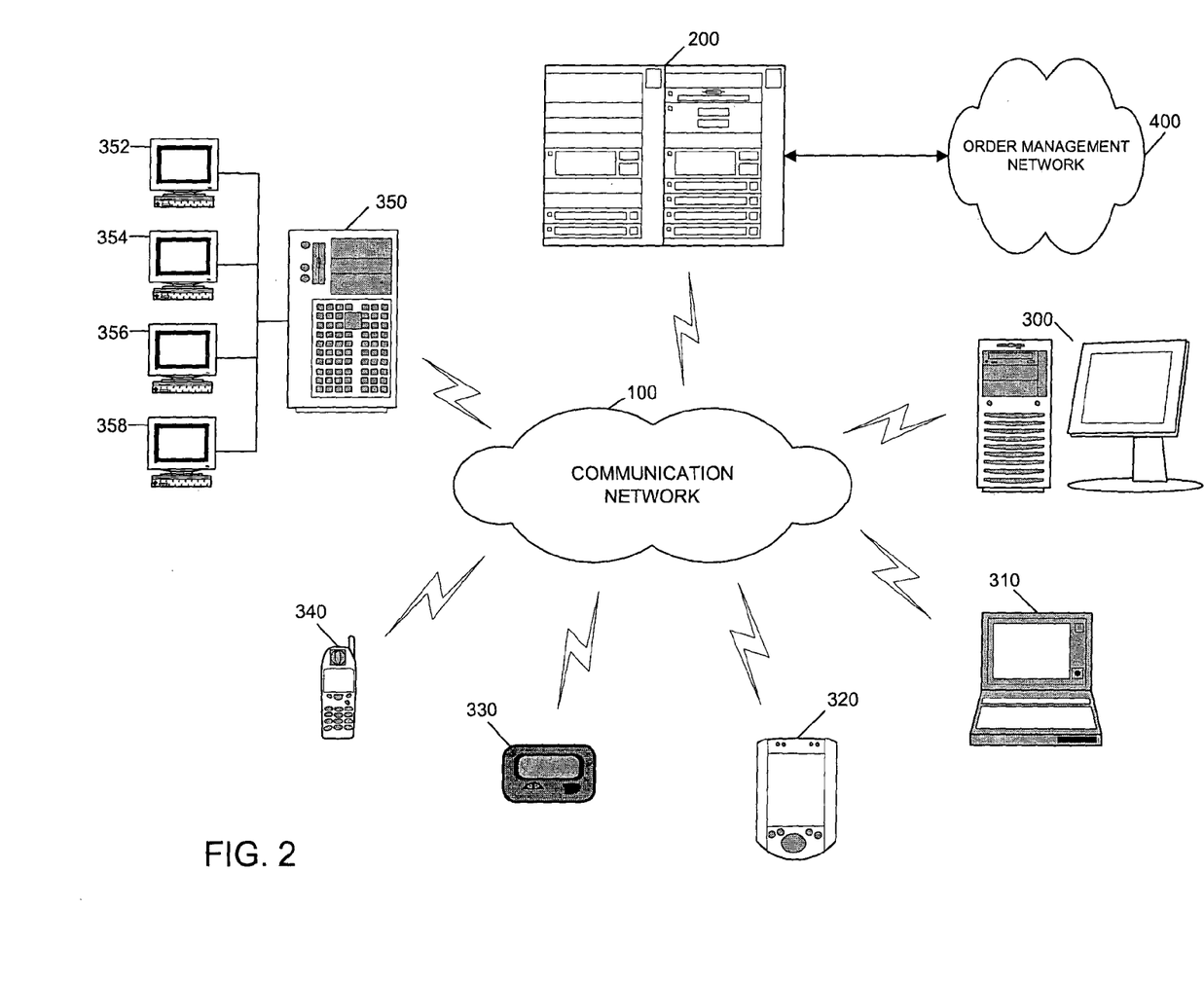
FIG. 2 is a topographic view of a network architecture according to some embodiments of the present invention.

FIG. 2 illustrates a network architecture of a system according to some embodiments of the present invention. As shown, communication network 100 provides communication between option server 200 and user devices 300 through 350.

Communication network 100 may comprise any number of different systems for transferring data, including a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), a Bluetooth network, an Infrared Radiation (IR) network, and/or an IP network such as the Internet, an intranet or an extranet. As used herein, the term "communication" can refer to wired and/or wireless communication as appropriate.

Option server 200 is used to provide a user with option quote information and order placement in accordance with some embodiments of the invention. The information and placement may be provided via a user interface such as interface 1 of FIG. 1. Option server 200 is depicted as a mainframe server in FIG. 1, but may comprise any device or devices capable of performing process steps attributed to server 200 herein. Moreover, option server 200 may present option information via interfaces to more than one user or company. Option server 200 may also provide functions that are related or unrelated to the functions described herein, such as trading account maintenance, file storage, or the like.

User devices 300 through 350 respectively comprise a personal computer, a personal digital assistant, a laptop computer, a wireless messaging device, a cellular telephone, and a network server. In this regard, user devices 352 through 358 communicate with communication network 100 through user device 350. As mentioned above, each of user devices 300 through 350 may be used to present a user interface to a user. User devices that may be used in conjunction with some embodiments of the invention therefore include devices that are capable of communicating with option server 200 over communication network 100, and of presenting an interface to a user in operation thereof. Each of user devices 300 through 358 may also provide functions to a user such as voice messaging, text messaging, word processing, electronic mail functions, calendar functions, or the like.

Order management network 400, such as REDINet, provides option server 200 with access to pools of liquidity. Accordingly, option server 200 may transmit instructions to order management network 400 to place one or more option orders in response to instructions received from a user through an interface such as interface 1. Due to the sensitivity of information passed between option server 200 and order management network 400, some embodiments of the communication link therebetween are secure, robust and redundant.

According to one specific example of the operation of the FIG. 2 architecture, option server 200 receives trade and quote data from various exchanges in the form of data feeds. The data feeds may be received from communication network 100 and may include a data feed from the Options Price Reporting Authority (OPRA), a consortium of all U.S. options markets. The OPRA data feed includes option quote information such as that shown in option quote areas 4 and 5 of interface 1.

The data feeds may also include a feed generated by the Consolidated Quote System (CQS), which collects and integrates trade and quote data from the New York Stock Exchange, American Stock Exchange, and regional exchanges. Information received by option server 200 from the CQS data feed may be used to populate equity information area 3 of interface 1. Of course, data received from other data sources may be presented by a user interface according to some embodiments of the present invention.

Option server 200 extracts information from the received data feeds and stores the extracted information in an appropriate database. A request for information is then received from one of user devices 300 through 350, and a response is transmitted to the one device. The user device uses the information to generate and present an interface such as interface 1 to a user. In some embodiments, option server 200 presents the interface to the requesting user device, which in turn presents the interface to the user.

As will be described in detail below, the user may use the interface to submit one or more option orders to option server 200. The orders are transmitted from option server 200 to network 400, and are thereafter placed in appropriate exchanges. Option server 200 then updates the user's trading account based on the order.

In other embodiments, the devices of FIG. 2 are connected differently than as shown. For example, some or all of the devices may be connected directly to one another. Of course, embodiments of the invention may include devices that are different from those shown. It should also be noted that although the devices are shown in communication with each other, the devices need not be constantly exchanging data. Rather, communication may be established when necessary and severed at other times or always available but rarely used to transmit data. Moreover, although the illustrated communication links appear dedicated, it should be noted that each of the links may be shared by other devices.

Option Server

Figure 3:
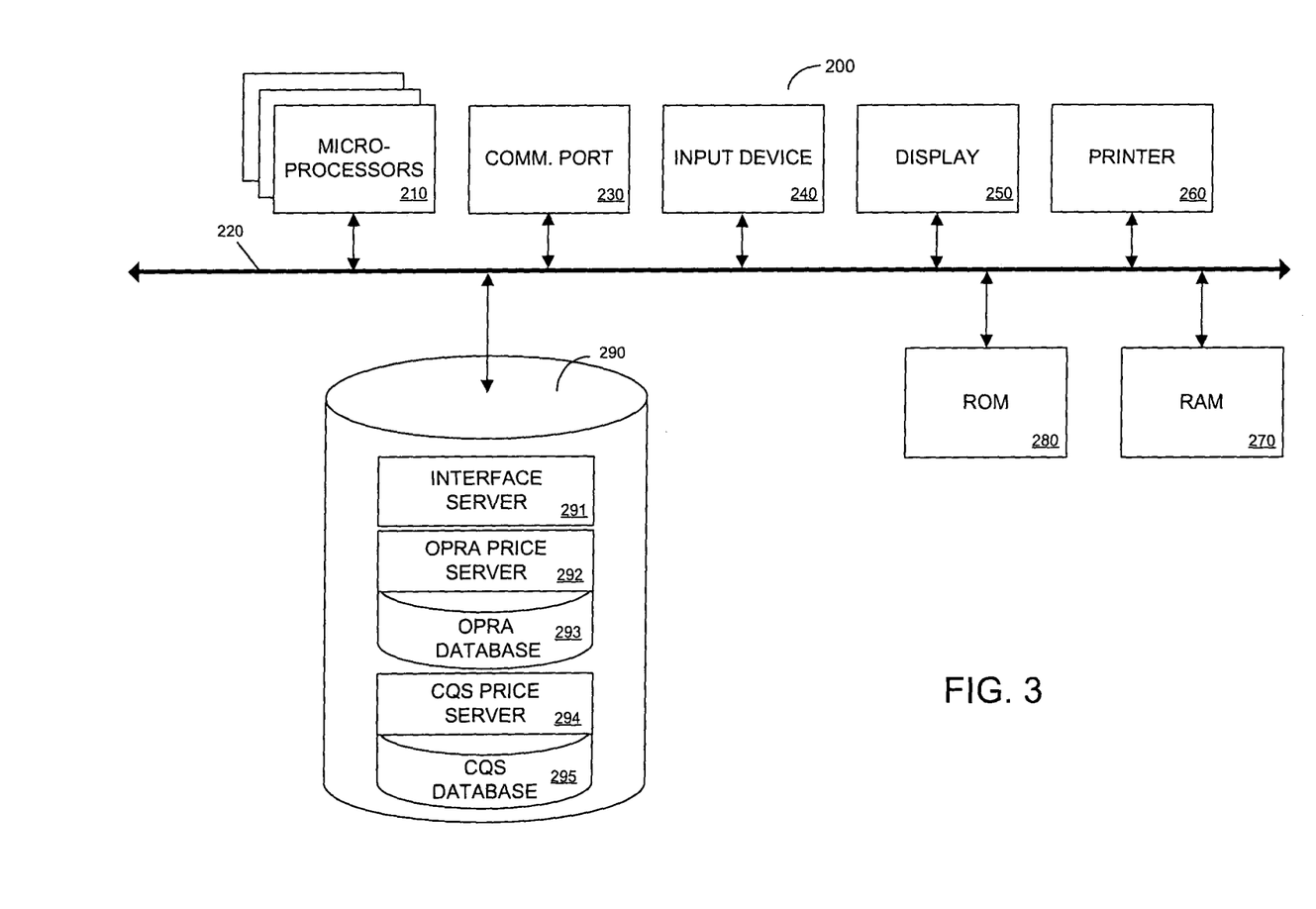
FIG. 3 is a block diagram of an internal architecture of an option server according to some embodiments to the present invention.

FIG. 3 is a block diagram of an internal architecture of option server 200 according to some embodiments of the invention. As illustrated, option server 200 includes microprocessors 210 in communication with communication bus 220. Microprocessors 210 may comprise RISC-based and other types of processors and are used to execute processor-executable process steps so as to control the elements of option server 200 to provide desired functionality.

Also in communication with communication bus 220 is communication port 230. Communication port 230 is used to transmit data to and to receive data from devices external to option server 200 such as devices 300 through 358. Communication port 230 is therefore preferably configured with hardware suitable to physically interface with desired external devices and/or network connections. For example, communication port 230 may comprise an Ethernet connection to a local area network through which option server 200 may receive and transmit information over the World Wide Web.

Communication port 230 also receives the OPRA and CQS data feeds, which share a common communications protocol and distribution network. The number of output lines that each feed requires is currently determined by a message rate required by each system. In some embodiments, the OPRA feed uses nine lines and the CQS data feed uses two lines. Market information is encoded in each of the data feeds using Bisync, a specially-modified legacy protocol. Accordingly, communication port 230 is configured with hardware and software for receiving and processing the data feeds.

Input device 240, display 250 and printer 260 are also in communication with communication bus 220. Any known input device may comprise input device 240, including a keyboard, mouse, touch pad, voice-recognition system, or any combination of these devices. Of course, information may also be input to option server 200 from other devices via communication port 230. Display 250 may be an integral or separate CRT present, flat-panel present or the like used to present an interface according to embodiments of the present invention, as well as other graphic and text elements, in response to commands issued by microprocessors 210. Printer 260 may also present text and graphic elements to an operator, but in hardcopy form using ink-jet, thermal, dotmatrix, laser, or other printing technologies. Elements 240 through 260 are most likely used sparingly during operation of option server 200, but may be used by an operator for setup and administration.

RAM 270 is connected to communication bus 220 to provide microprocessors 210 with fast data storage and retrieval. In this regard, processor-executable process steps being executed by microprocessors 210 are typically stored temporarily in RAM 270 and executed therefrom by microprocessors 210. ROM 270, in contrast, provides storage from which data can be retrieved but to which data cannot be stored. Accordingly, ROM 280 is used to store invariant process steps and other data, such as basic input/output instructions and data used during boot-up of option server 200 or to control communication port 230. It should be noted that one or both of RAM 270 and ROM 280 may communicate directly with microprocessors 210 instead of over communication bus 220.

Data storage device 290 stores, among other data, processor-executable process steps of interface server 291. Microprocessors 210 therefore execute the process steps of interface server 291 in order to control option server 200 to present an interface according to some embodiments of the present invention. In some embodiments, option server 200 is controlled to present at least one option quote area presenting a plurality of option quotes, and to present an order entry area comprising input areas for inputting two or more option orders. According to a specific example, user device 300 transmits a request for information to option server 200 and interface server 291 is used to present an interface to user device 300 in response to the request.

In order to present such an interface, interface server 291 is used in conjunction with processor-executable process steps of OPRA price server 292. The steps of OPRA price server 292 may be executed to extract data from the received OPRA price feed according to the above-mentioned protocols. The extracted data is stored in OPRA database 293, which is described in detail with respect to FIG. 5. Generally, OPRA database 293 includes option quote information such as that presented in option quote areas 4 and 5 of interface 1.

Data storage device 290 also stores CQS price server 294 and CQS database 295, which provide functionality similar to OPRA price server 294 and OPRA database 296. However, the functionality is provided with respect to a received CQS data feed. In this regard, CQS price server 294 and CQS database 295 are used to present information such as that shown in equity information area 3 of interface 1.

Any or all process steps of interface server 291, OPRA price server 292, and CQS price server 294 may be read from a computer-readable medium, such as a floppy disk, a CD-ROM, a DVD-ROM, a Zip™ disk, a magnetic tape, or a signal encoding the process steps, and then stored in data storage device 290 in a compressed, uncompiled and/or encrypted format. In alternative embodiments, hard-wired circuitry may be used in place of, or in combination with, processor-executable process steps for implementation of processes according to embodiments of the present invention. Thus, embodiments of the present invention are not limited to any specific combination of hardware and software.

Also stored in data storage device 290 may also be other unshown elements that may be necessary for operation of option server 200, such as an operating system, a database management system, other applications, other data files, and "device drivers" for allowing microprocessors 210 to interface with devices in communication with communication port 230. These elements are known to those skilled in the art, and are therefore not described in detail herein.

User Device

Figure 4:
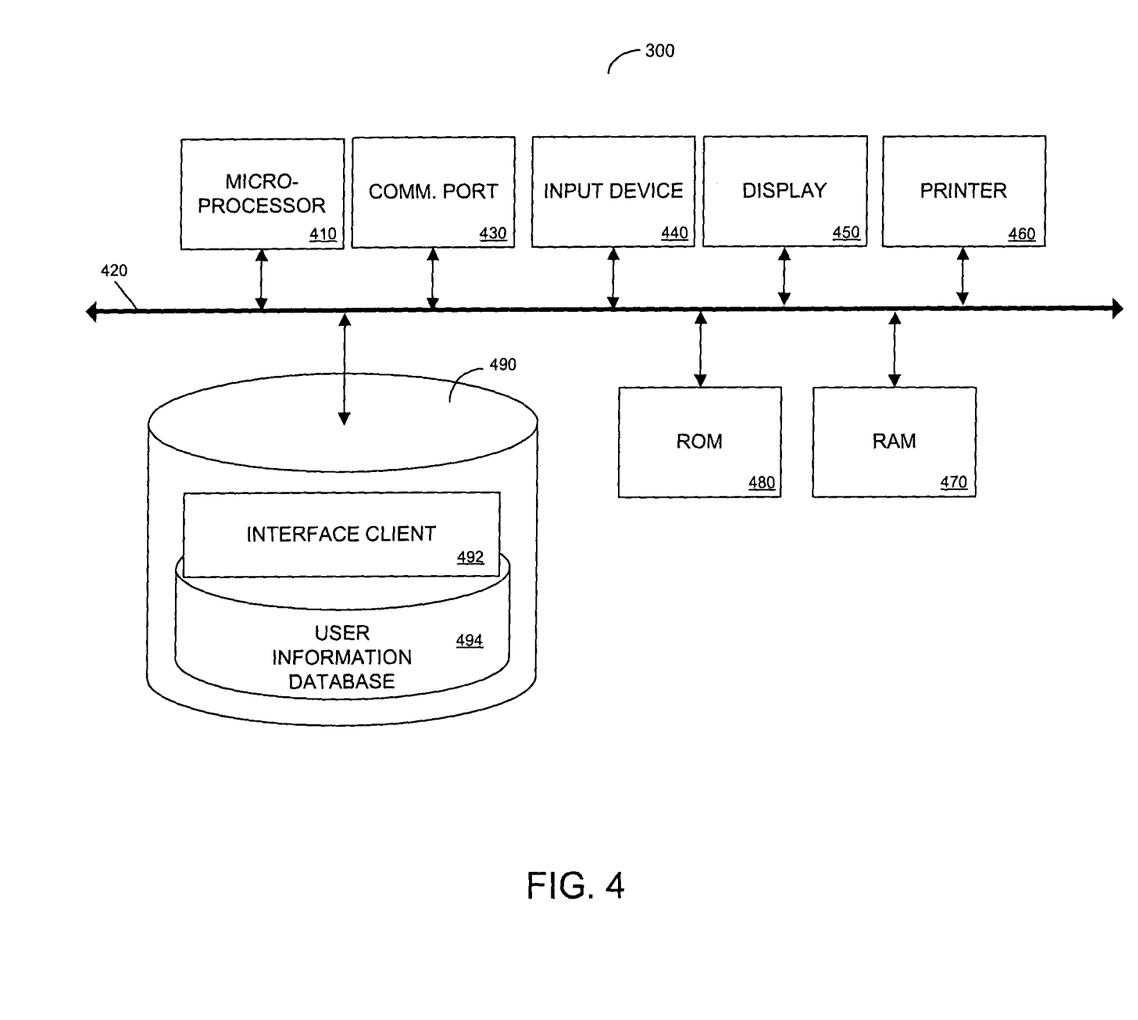
FIG. 4 is a block diagram of an internal architecture of a client device according to some embodiments to the present invention.

FIG. 4 is a block diagram of the internal components of user device 300 according to some embodiments of the invention. It should be noted that these distinct components may comprise any of the specific examples given above with respect to identically-named components of option server 200. Of course, specific functions performed by the components may differ from the functions performed by the identically-named components.

In operation, process steps of interface client 492 are executed by microprocessor 310 to present an interface to a user on display 450. According to some embodiments of the invention, a user operates input device 440 to input commands to an interface presented on display 450. In response to the commands, interface client 492 requests option-related information from interface server 291 using communication port 430, interface server 291 is used to retrieve the information from appropriate fields of OPRA price database 293 and CQS price database 294, the information is transmitted to user device 300, and interface client 492 is used to generate an interface in accordance with the present invention using the information. The interface is then presented to a user via display 450.

Interface client 492 may also be used to present an interface including an order entry area having input areas for inputting two or more option orders, to receive one or more option orders input into the input areas by a user, and to transmit a request to place the orders to option server 200. As described above, the request may be forwarded to order management network 400, which in turn places the orders in an appropriate exchange. Moreover, process steps of interface client 492 may be executed to receive a selection of an option quote presented by the interface and to populate appropriate input areas of the order entry area with an option order corresponding to the selected option quote.

User information database 494 includes information such as a name, account number, and authorization data associated with an operator of user device 300. This information may be used by user device 300 and/or option server 200 to identify the information to which the user has access, to determine an appearance of an interface based on the user's preferences, and to automate functions such as order entry or the like.

Storage device 490 may store one or more of other applications, data files, device drivers and operating system files needed to provide functions other than those directly related to the present invention. Such functions may include calendar functions, electronic mail functions, word processing, presentation development and the like.

Databases

Figure 5:
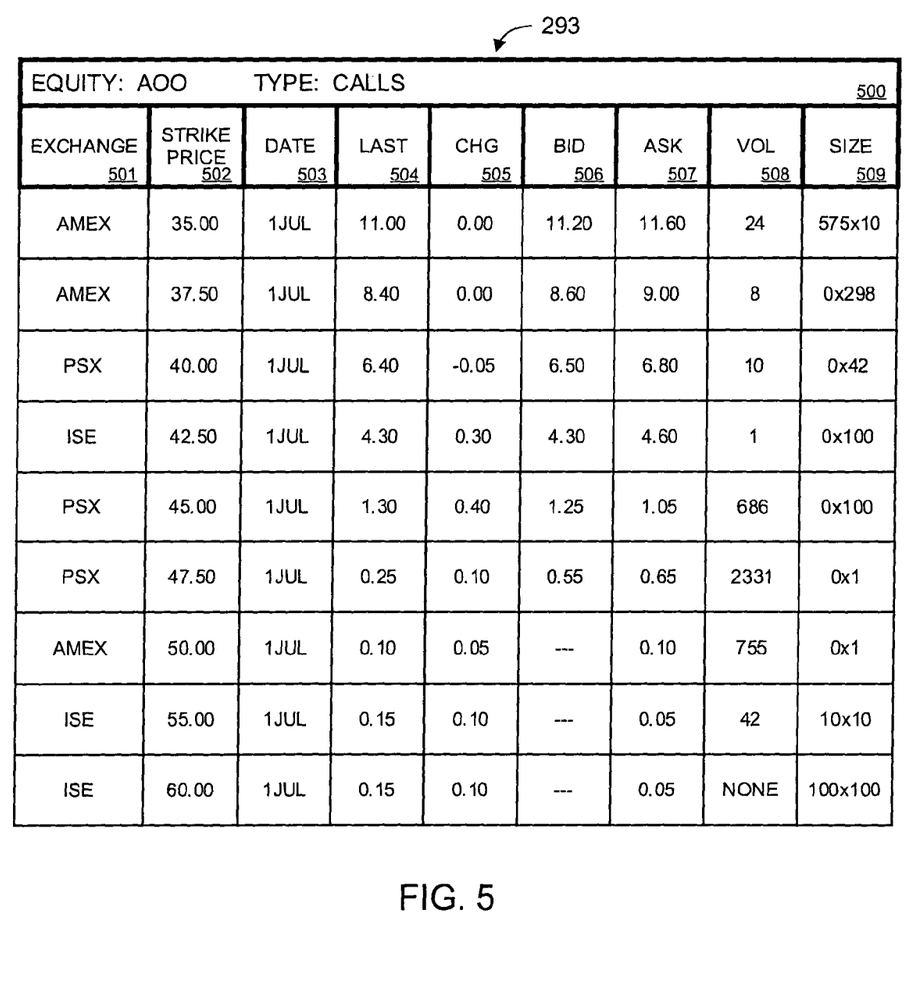
FIG. 5 is a representative view of a tabular portion of an OPRA (Option Prices Reporting Authority) database according to some embodiments of the present invention.

A tabular representation of a portion of OPRA database 293 is shown in FIG. 5. The information stored in OPRA database 293 includes information relating to options that is transmitted to option server 200 via an OPRA price feed and is then extracted from the OPRA price feed using OPRA price server 292. As described above, the information may be used by interface server 291 and/or interface client 492 to generate an interface according to some embodiments of the present invention. OPRA database 293 of FIG. 5 includes several records, each consisting of several fields. The fields include option identifier field 500, exchange field 501, strike price field 502, date field 503, last field 504, change field 505, bid field 506, ask field 507, volume field 508, and size field 509.

Option identifier field 500 specifies an equity underlying the options represented in the tabular portion of FIG. 5, and also specifies whether the represented options are Call or Put options. Accordingly, OPRA price database 293 may include other unshown portions that are associated with other equities. Of course, OPRA price database 293 may segment and store option information according to combinations of identifying information other than that shown in field 500 of FIG. 5.

Each record of database 293 is associated with a single option quote. Exchange field 501 of a record specifies an exchange from which the associated option quote was obtained, while strike price field 502 and date field 503 further identify the option to which the quote pertains. Fields 504 through 509 include Level II option quote information related to the option identified by associated fields 500, 502 and 503. This option quote information, as described above, may be extracted from an OPRA price feed by OPRA price server 292.

The portion of FIG. 5 shows one option quote for each option identified therein. In some embodiments, this quote represents a most-current quote available for the option. Also in some embodiments, this quote represents a best quote current for the available option. OPRA price database 293, in some embodiments, stores all received quotes for a given option and, in some embodiments, stores only quotes associated with particular exchanges.

Figure 6:
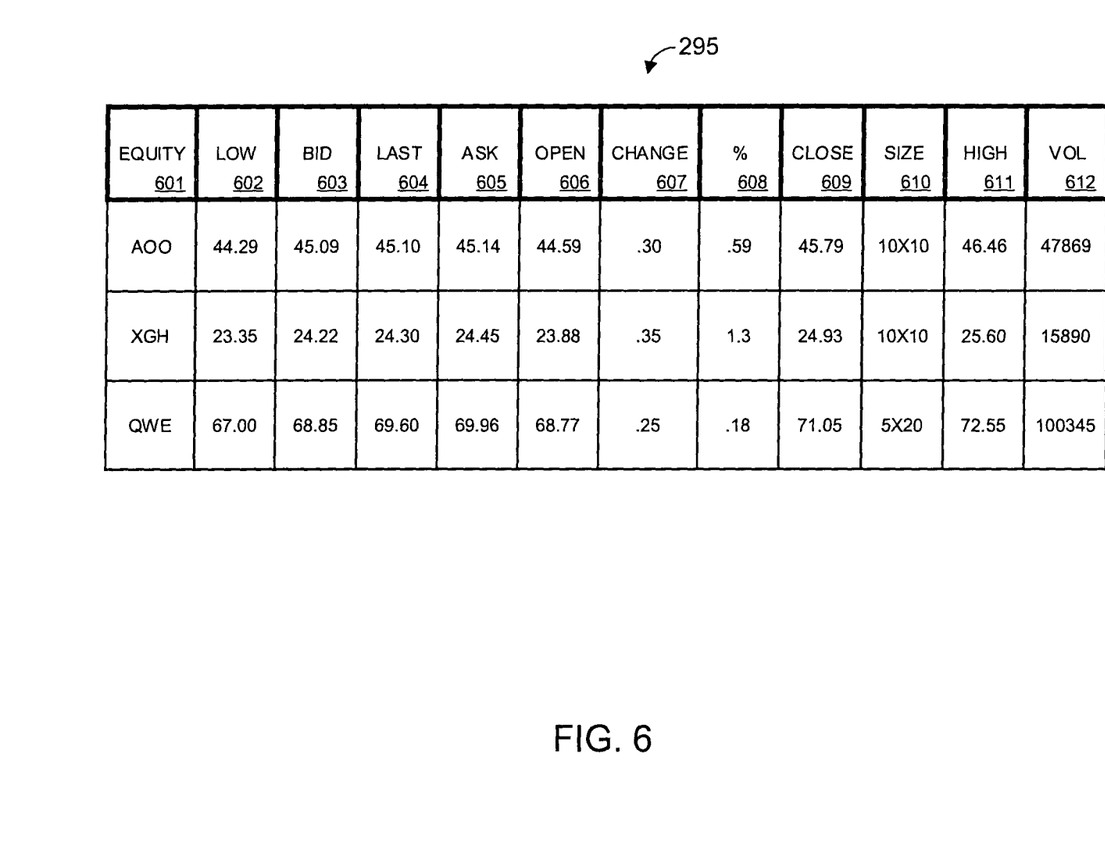
FIG. 6 is a representative view of a tabular portion of a CQS (Consolidated Quote System) database according to some embodiments of the present invention.

FIG. 6 illustrates a tabular representation of a portion of CQS price database 295. Each record of the illustrated portion represents an equity specified in equity field 601. The remaining fields of each record provide Level I information associated with the specified equity. As described with respect to OPRA price database 293, the information stored in CQS database 293 may include most-current, best, all, and/or exchange-specific information associated with the equity.

Figure 7:
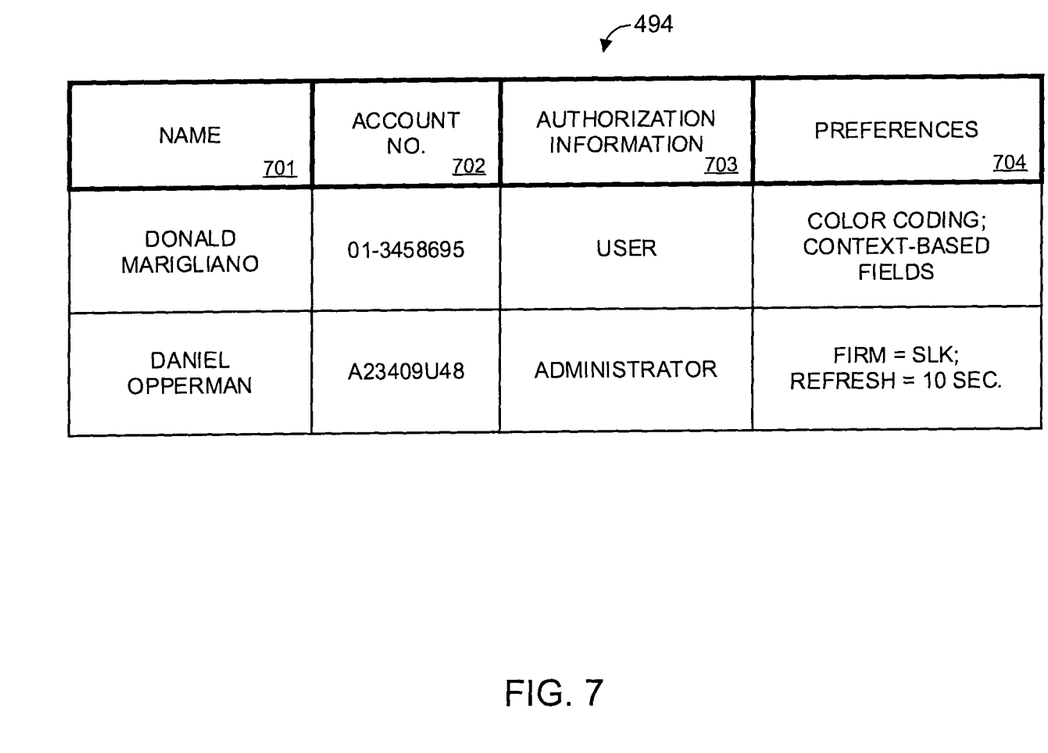
FIG. 7 is a representative view of a tabular portion of a user information database according to some embodiments of the present invention.

A tabular representation of a portion of user information database 494 is represented in FIG. 7. As described above, the portion stores information used to determine a user's access rights, to place an option order, and/or to generate an interface according to some embodiments of the present invention. Each record of the portion includes name field 701, which specifies a name of a user, account number field 702, which provides an account number of the user, authorization information field 703, which provides information for determining access rights of the user, and preferences field 704, which indicates preferences of the user. The preferences may relate to preferred interface features, preferred order parameters, and/or other preferences of the user.

In one specific operation using the foregoing databases, option server 200 receives a request from user device 300 for option information. According to some embodiments, the request specifies an equity and data input by a user into fields 7 through 10 of interface 1. Option server 200 determines required option quote information based on the request and on the information stored in OPRA price database 293, determines required equity information based on the request and on the information stored in CQS price database 295, and forwards the determined information to user device 300. Interface client 492 of user device 300 uses the forwarded information and information specified in preferences field 704 associated with the user to generate an interface such as interface 1 and presents the interface to the user.

The user operates input device 440 to input information into the fields of order bar 11 and order entry area 12. Some information may be automatically entered by interface client 492 during or after generation of the interface based on information stored in user information database 494 such as information associated with the user in preferences field 704. In some embodiments, the user selects option quote information of a particular option quote and, in response, interface client 492 populates order entry area 12 with information associated with the selected option quote information. The user selects Submit button 13 to submit one or more orders to option server 200 based on the information populating order bar 11 and order entry area 12. Order placement will be described in more detail below with respect to FIGS. 9 and 10.

It should be noted that tome embodiments of the present invention do not utilize databases such as OPRA price database 293 and CQS price database 295. In some of these embodiments, required price information is extracted from an appropriate data feed in real-time and used to generate an interface according to embodiments of the invention. This information may be stored temporarily in a storage device such as RAM 270.

It should be noted that the illustrations and accompanying descriptions of databases included herein merely represent relationships between stored information. A number of other arrangements may be employed besides those suggested, including arrangements in which some or all of the specified data is located remote from the device with which it is associated herein. It is further contemplated that each of the databases may include many more records than those shown and that each record may include associated fields other than those illustrated.

Interface Operation

Figure 8:
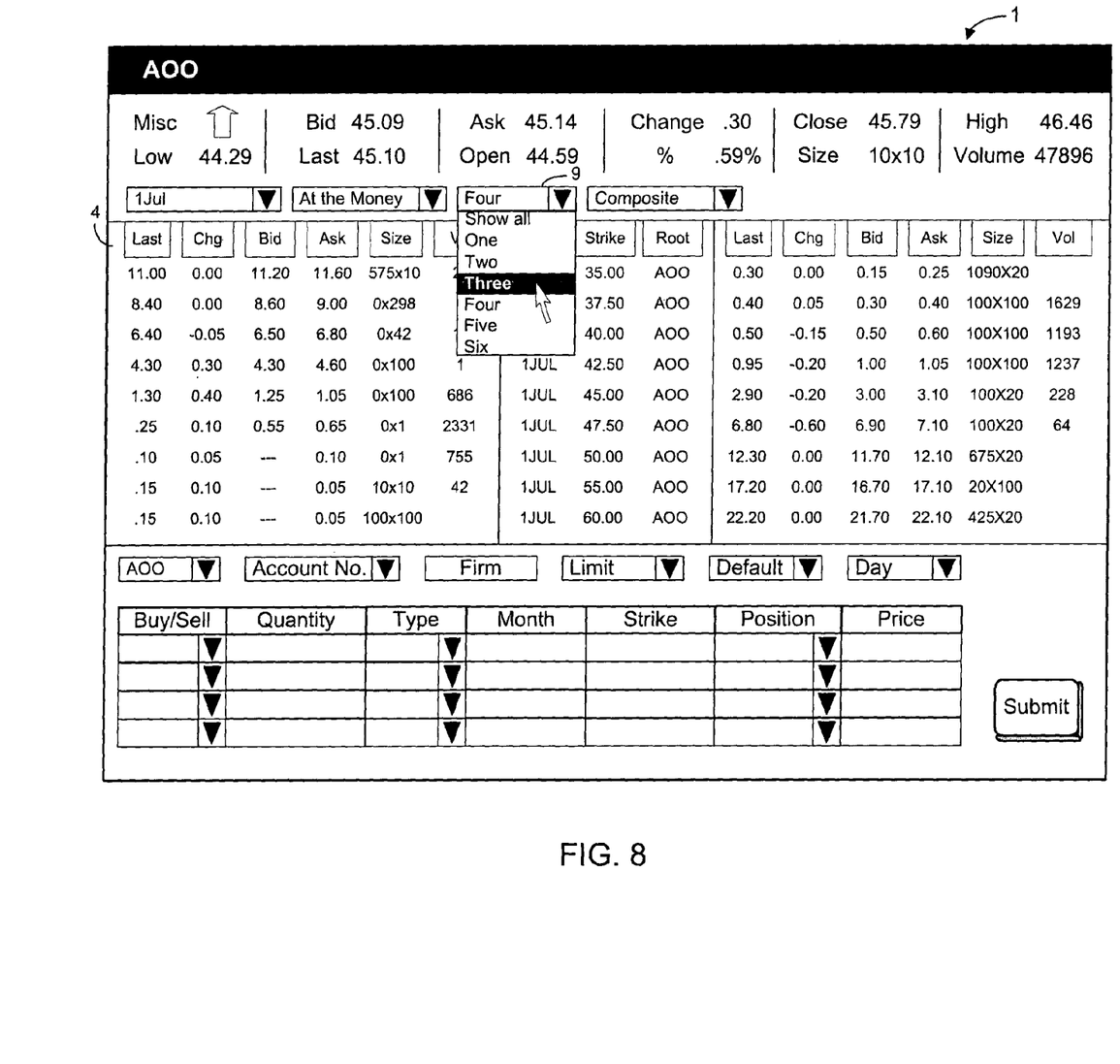
FIG. 8 is an outward view of a user interface according to some embodiments of the present invention.

FIG. 8 illustrates an outward view of user interface 1 as presented by display 450 of user device 300. As shown, a user has operated input device 440 to open the pull-down menu of show field 9. In addition, the user has selected the input value "Three" of the pull-down menu.

Figure 9:
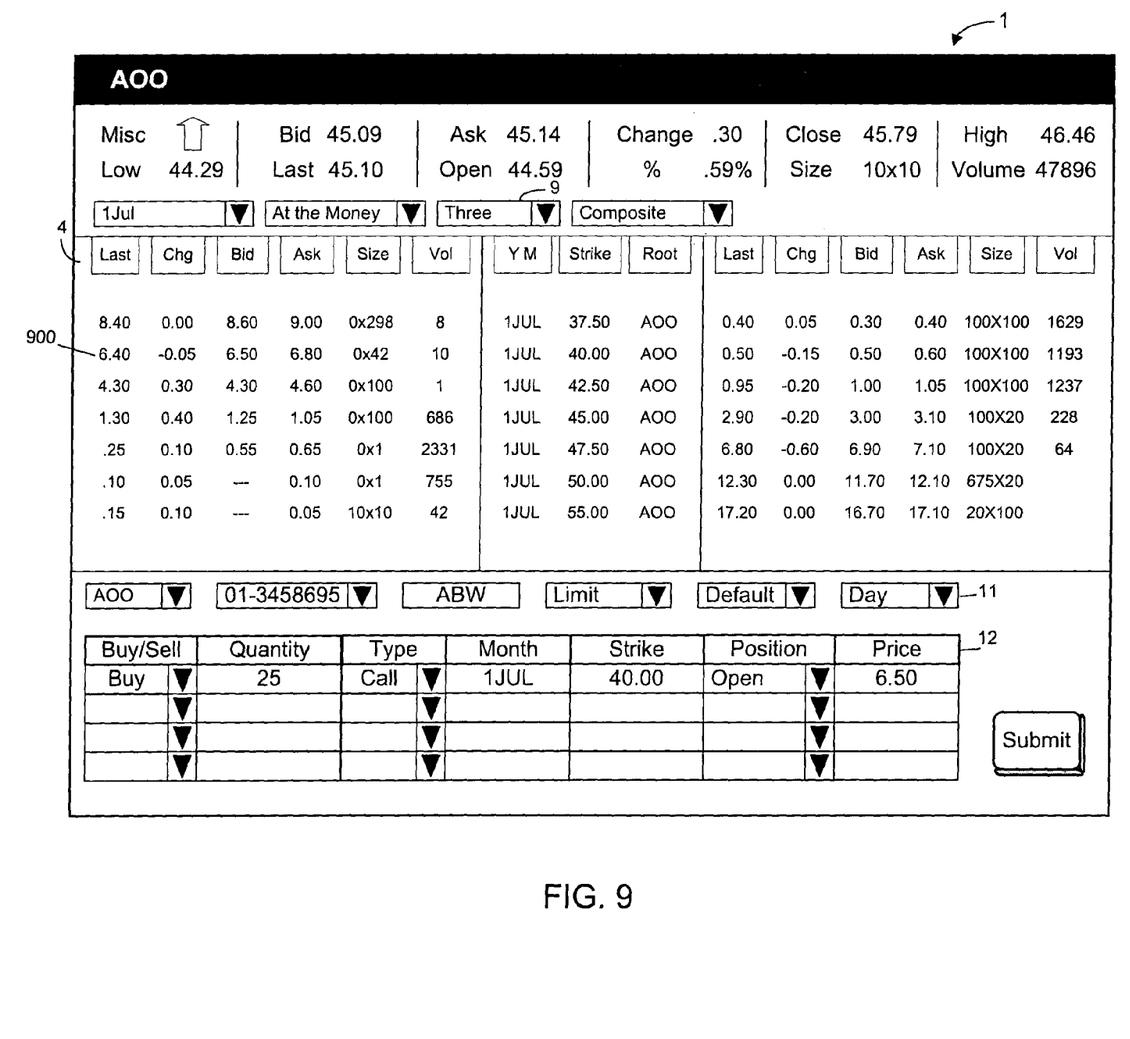
FIG. 9 is an outward view of a user interface according to some embodiments of the present invention.

FIG. 9 illustrates user interface 1 after the input operation illustrated in FIG. 8. In particular, the change input to field 9 was detected by interface client 492 and interface client 9 altered interface 1 in response to the change. Specifically, option quote information corresponding to only three options that are associated with strike prices above the price specified in field 8 and only three options that are associated with strike prices below the specified price are presented in each of areas 4 and 5. As described with respect to FIG. 1, interface client 492 of other embodiments of the present invention may provide different functionality with respect to show field 9.

Also shown in FIG. 9 are changes to order bar 11 and order entry area 12. In the present embodiment, the fields of order bar 11 are populated using associated pull-down menus, by manual entry, or by pulling associated data such as a user account number from appropriate fields of user information database 494. According to one example, information associated with a user in preferences field 704 of user information database 494 may indicate that the user prefers context-based fields. In this example, the user inputs a firm giveup into an appropriate field of order bar 11 and, in response, interface client 492 is used to determine an order type and a period during which the order should be in force, and to populate order bar 11 with the determined information.

Order entry area 12 of FIG. 9 is populated with details of an option order. As mentioned above with respect to order bar 11, the details may be input using associated pull-down menus and/or by manual entry. In some embodiments, the details are input by selecting option quote information in option quote areas 4 or 5. For example, the user of the present example has selected option quote information 900 of option quote area 4 and, in response, a row of order entry area 12 is populated with details corresponding to the selected option quote. The row may be partially or fully populated in response to the selection and based on context and/or user preferences.

Figure 10:
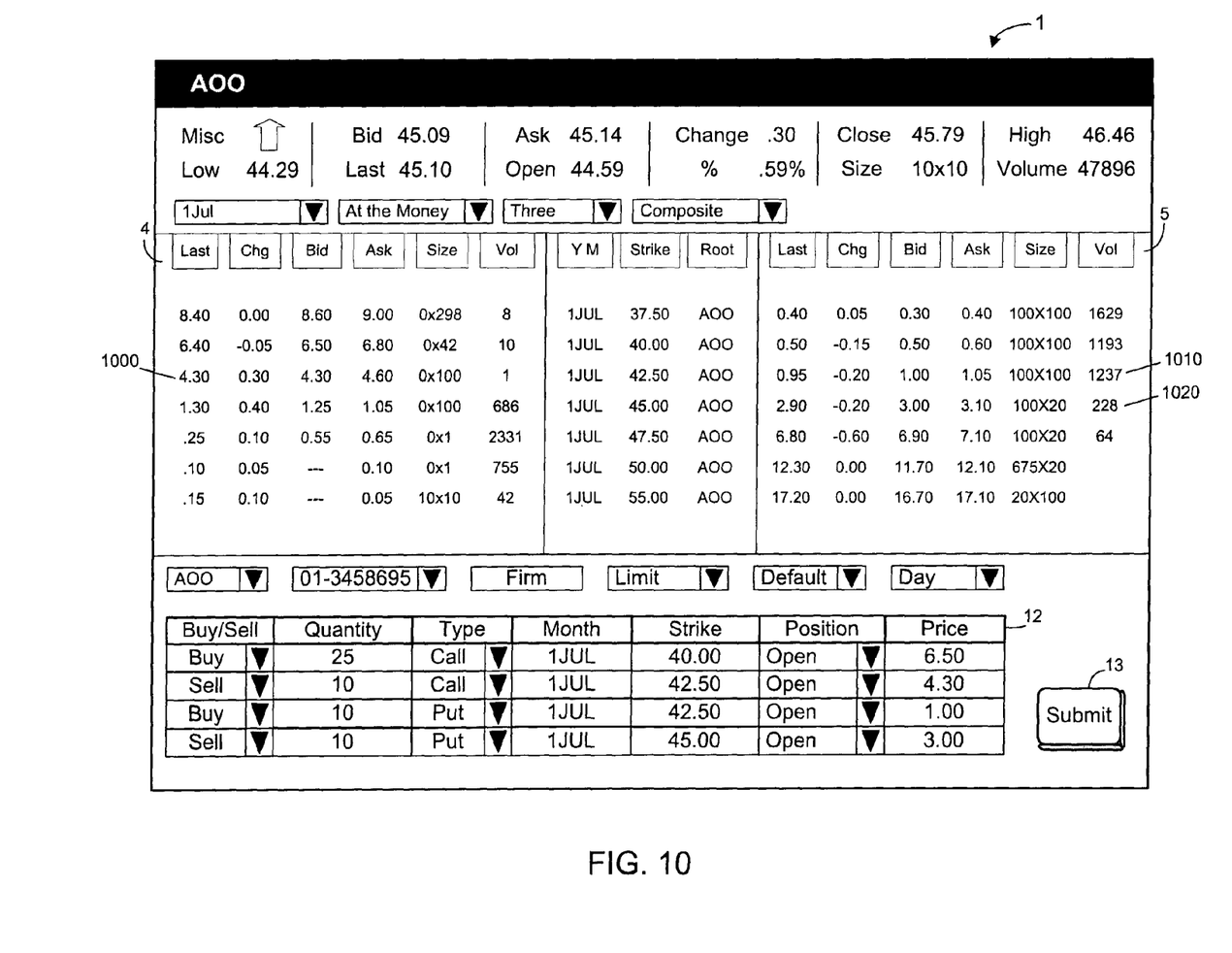
FIG. 10 is an outward view of a user interface according to some embodiments of the present invention.

FIG. 10 illustrates interface 1 after user selection of option quote information 1000, 1010, and 1020 according to some embodiments of the invention. It should be noted that some or all of the fields of order entry 12 may be populated manually, using pull-down menus, or by selection of option quote information fro option quote areas 4 and 5. It should also be noted that the orders reflected in order entry area 12 may comprise one or more options strategy positions such as a butterfly spread, a bear spread, and a bull spread.

The orders reflected in order entry area 12 are placed in response to user selection of Submit button 13. Specifically, interface client 494 transmits details of the orders to interface server 291 in response to user selection of Submit button 13. The details are transmitted from option server 200 to order management network 400, and are thereafter placed in appropriate exchanges. Option server 200 then updates the user's trading account based on the order.

By virtue of one or more of the foregoing features, some embodiments of the present invention provide interface customization and order placement that is more efficient than that currently provided by electronic trading platforms. It should be noted that a user interface according to embodiments of the present invention may include fewer or more features and may be arranged differently than as shown. Moreover, all or some of the features of user interface 1 may be located within one or more user interface windows.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A processor-implemented method for electronic trading comprising:
  presenting a graphical user interface, the graphical user interface comprising:
    at least one option quote area for presenting a plurality of option quotes;
    an order entry area comprising input areas for inputting two or more option orders selected from the presented plurality of option quotes; and
    a submit user control to facilitate simultaneously placing multiple option orders, wherein each multiple simultaneous option order is individually configurable as a buy or sell;
  receiving via a processor a user selection of one of the presented plurality of option quotes for order placement;
  automatically populating at least one of the input areas of the order entry area with attributes of first and subsequent option orders corresponding to user-selected option quotes prior to simultaneous order placement;
  iteratively receiving a user selection and automatically populating the option order input area until the submit user control is activated;
  retrieving user preferred order placement parameters from a database;
  configuring the selected option orders with the retrieved user preferred order placement parameters; and
  placing the configured option orders simultaneously when the submit user control is activated.

2. The method according to claim 1, wherein presenting at least one option quote area comprises:
  receiving numbers of option quotes to present in the presented option quote areas; and
  presenting option quotes in the presented option quote areas based on the numbers received for the corresponding option quote areas.

3. The method according to 1, wherein presenting at least one option quote area comprises:
  receiving strike prices above and/or below a particular strike price for which option quotes are presented in option quote areas; and
  presenting option quotes associated with the strike prices above and/or below the particular strike price in option quote areas.

4. The method according to claim 3, wherein the particular strike price is equal to a current price of a security underlying the option.

5. The method according to claim 1, wherein presenting at least one option quote area comprises:
  determining one of a plurality of brightness levels of a color wherein a level of brightness is based on a difference between a strike price of an option quote and a price of a security underlying the presented option quote;
  presenting the option quote in association with the one of a plurality of brightness levels;
  presenting the option quote in association with the color.

6. The method according to claim 1, wherein presenting at least one option quote area comprises:
  determining an option exchange associated with an option quote;
  determining a color associated with the option exchange; and
  presenting the option quote in association with the color.

7. A computer-readable medium storing a plurality of processor-executable directives, the directives comprising instructions to:
  present a graphical user interface, the graphical user interface comprising:
    at least one option quote area for presenting a plurality of option quotes;
    an order entry area comprising input areas for inputting two or more option orders selected from the presented plurality of option quotes; and
    a submit user control to facilitate simultaneously placing multiple option orders, wherein each multiple simultaneous option order is individually configurable as a buy or sell;
  receive a user selection of one of the presented plurality of option quotes for order placement;
  automatically populate at least one of the input areas of the order entry area with attributes of first and subsequent option orders corresponding to user-selected option quotes prior to simultaneous order placement;

iteratively receive a user selection and automatically populate the option order input area until the submit user control is activated;
retrieve user preferred order placement parameters from a database;
configure the selected option orders with the retrieved user preferred order placement parameters; and
place the retrieved option orders simultaneously when the submit user control is activated.

8. The medium according to claim 7, wherein the instruction to present at least one option quote area comprises instructions to:
receive strike prices above and/or below a particular strike price for which option quotes are presented in option quote areas; and
present option quotes associated with the strike prices above and/or below the particular strike price in option quote areas.

9. The medium according to claim 8, wherein the particular strike price is equal to a current price of a security underlying the option.

10. An electronic trading apparatus comprising:
a processor; and
a storage device in communication with the processor and storing instructions issuable by the processor to:
present a graphical user interface, the graphical user interface comprising:
at least one option quote area for presenting a plurality of option quotes;
an order entry area comprising input areas for inputting two or more option orders selected from the presented plurality of option quotes; and
a submit user control to facilitate simultaneously placing multiple option orders, wherein each multiple simultaneous option order is individually configurable as a buy or sell;
receive a user selection of one of the presented plurality of option quotes for order placement;
automatically populate at least one of the input areas of the order entry area with attributes of first and subsequent option orders corresponding to user-selected option quotes prior to simultaneous order placement;
iteratively receive a user selection and automatically populate the option order input area until the submit user control is activated;
retrieve user preferred order placement parameters from a database;
configure the selected option orders with the retrieved user preferred order placement parameters; and
place the retrieved option orders simultaneously when the submit user control is activated.

11. The apparatus according to claim 10, wherein the instruction to present at least one option quote area comprises instructions to:
receive strike prices above and/or below a particular strike price for which option quotes are presented in option quote areas; and
present option quotes associated with the strike prices above and/or below the particular strike price in option quote areas.

12. The apparatus according to claim 11, wherein the particular strike price is equal to a current price of a security underlying the option.

13. An enhanced option trading system comprising:
an option server for receiving option quote information and for transmitting option quote information; and
a client device in communication with the option server, the client device configured to:
present a graphical user interface, the graphical user interface comprising:
at least one option quote area for presenting a plurality of option quotes;
an order entry area comprising input areas for inputting two or more option orders selected from the presented plurality of option quotes; and
a submit user control to facilitate simultaneously placing multiple option orders, wherein each multiple simultaneous option order is individually configurable as a buy or sell;
receive a user selection of one of the presented plurality of option quotes for order placement;
automatically populate at least one of the input areas of the order entry area with attributes of first and subsequent option orders corresponding to user-selected option quotes prior to simultaneous order placement;
iteratively receive a user selection and automatically populate the option order input area until the submit user control is activated;
retrieve user preferred order placement parameters from a database;
configure the selected option orders with the retrieved user preferred order placement parameters; and
place the retrieved option orders simultaneously when the submit user control is activated.

14. The system according to claim 13, wherein the client device receives strike prices above and/or below a particular strike price for which option quotes are presented in option quote areas, and presents option quotes associated with the strike prices above and/or below the particular strike price in option quote areas.

15. The method according to claim 1, further comprising presenting in the graphical user interface attributes of the plurality of presented option quotes.

16. The medium according to claim 7, wherein the directives further comprise instructions to present in the graphical user interface attributes of the plurality of presented option quotes.

17. The apparatus according to claim 10, wherein the storage device further stores instructions to present in the graphical user interface attributes of the plurality of presented option quotes.

18. The system according to claim 13, wherein the client device is further configured to present in the graphical user interface attributes of the plurality of presented option quotes.

* * * * *

UNITED STATES PATENT AND TRADEMARK OFFICE
CERTIFICATE OF CORRECTION

PATENT NO. : 8,666,869 B2  Page 1 of 1
APPLICATION NO. : 10/634698
DATED : March 4, 2014
INVENTOR(S) : Donald E. Marigliano It is certified that error appears in the above-identified patent and that said Letters Patent is hereby corrected as shown below:

In the Claims

Column 12, claim 3, line 20, after "according to" insert --claim--

Signed and Sealed this
Fifth Day of August, 2014

Michelle K. Lee
*Deputy Director of the United States Patent and Trademark Office*